United States Patent
Derakhshani (10) Patent No.: US 10,320,779 B2
(45) Date of Patent: Jun. 11, 2019

(54) BIO LEASH FOR USER AUTHENTICATION

(71) Applicant: EyeVerify, Inc., Kansas City, KS (US)

(72) Inventor: Reza R. Derakhshani, Shawnee, KS (US)

(73) Assignee: EyeVerify Inc., Kansas City, MO (US)

( * ) Notice: Subject to any disclaimer, the term of this patent is extended or adjusted under 35 U.S.C. 154(b) by 0 days.

(21) Appl. No.: 14/672,629

(22) Filed: Mar. 30, 2015

(65) Prior Publication Data
US 2015/0288688 A1    Oct. 8, 2015

Related U.S. Application Data

(60) Provisional application No. 61/976,219, filed on Apr. 7, 2014.

(51) Int. Cl.
| | | |
|---|---|---|
| *H04L 29/06* | (2006.01) |
| *G06F 21/32* | (2013.01) |
| *H04M 1/673* | (2006.01) |
| *H04W 12/12* | (2009.01) |
| *G06F 21/62* | (2013.01) |

(Continued)

(52) U.S. Cl.
CPC .......... *H04L 63/0861* (2013.01); *G06F 21/32* (2013.01); *G06F 21/629* (2013.01); *G06F 21/88* (2013.01); *G06K 9/00335* (2013.01); *G06K 9/00771* (2013.01); *H04M 1/673* (2013.01); *H04W 12/12* (2013.01); *G06F 21/316* (2013.01); *G06F 2221/2141* (2013.01);

(Continued)

(58) Field of Classification Search
CPC ............. H04L 63/0861; H04L 63/0492; H04L 9/3226; G06F 3/017; G06F 21/32; G06F 21/629; G06F 21/88; G06F 21/34; G06F 2221/2133; G06F 21/316; G06F 2221/2141; G06F 2221/2147; H04M 1/673; H04M 2250/12; H04M 2250/52; H04W 12/12
USPC .... 726/5–7, 16–20; 713/182, 183, 186, 176, 713/178; 455/410, 411
See application file for complete search history.

(56) References Cited

U.S. PATENT DOCUMENTS

| | | |
|---|---|---|
| 8,396,265 B1 | 3/2013 | Ross et al. |
| 8,457,367 B1 | 6/2013 | Sipe et al. |

(Continued)

FOREIGN PATENT DOCUMENTS

| | | |
|---|---|---|
| WO | WO-2016/204968 A1 | 12/2016 |

OTHER PUBLICATIONS

International Search Report and Written Opinion for International Patent Application No. PCT/US2015/023344 dated Sep. 16, 2015 (14 pages).

(Continued)

*Primary Examiner* — John B King
(74) *Attorney, Agent, or Firm* — Goodwin Procter LLP (57) ABSTRACT

Systems and methods for electronically leashing a user to a mobile device. A user is authenticated on the mobile device and initial sensor data (e.g., radio signal readings, accelerometer readings, image/video, audio) is collected. Based on a timer or other triggering event, additional sensor data is captured and evaluated. Based on the evaluation of the sensor data, a value representing a likelihood of whether the device remains in possession of the user is determined. Upon determining that this value is less than a threshold, the user is required to reauthenticate on the mobile device to further engage with the device or particular features on the device.

28 Claims, 2 Drawing Sheets

(51) Int. Cl.
  *G06F 21/88* (2013.01)
  *G06K 9/00* (2006.01)
  *G06F 21/31* (2013.01)

(52) U.S. Cl.
  CPC . *G06F 2221/2147* (2013.01); *H04M 2250/12* (2013.01); *H04M 2250/52* (2013.01)

(56) References Cited

U.S. PATENT DOCUMENTS

| | | | |
|---|---|---|---|
| 8,700,137 B2 | 4/2014 | Albert | |
| 8,978,117 B2* | 3/2015 | Bentley | G06F 21/31 |
| | | | 455/411 |
| 9,166,962 B2* | 10/2015 | Goldsmith | H04L 63/08 |
| 9,202,105 B1 | 12/2015 | Wang et al. | |
| 9,231,765 B2* | 1/2016 | Flautner | H04L 9/3226 |
| 9,251,427 B1 | 2/2016 | Chu et al. | |
| 9,396,537 B2 | 7/2016 | Hirvonen | |
| 9,665,784 B2 | 5/2017 | Derakhshani et al. | |
| 2002/0180586 A1* | 12/2002 | Kitson | G06F 21/32 |
| | | | 340/5.82 |
| 2009/0232361 A1* | 9/2009 | Miller | G06K 9/6293 |
| | | | 382/115 |
| 2012/0001725 A1* | 1/2012 | Chen | H04L 63/0492 |
| | | | 340/5.6 |
| 2012/0019379 A1* | 1/2012 | Ben Ayed | G08B 13/1436 |
| | | | 340/539.1 |
| 2012/0252411 A1* | 10/2012 | Johnsgard | G07C 9/00158 |
| | | | 455/411 |
| 2013/0102283 A1* | 4/2013 | Lau | H04W 12/06 |
| | | | 455/411 |
| 2013/0198832 A1 | 8/2013 | Draluk et al. | |
| 2013/0251215 A1 | 9/2013 | Coons | |
| 2013/0324081 A1* | 12/2013 | Gargi | H04M 1/67 |
| | | | 455/411 |
| 2013/0326592 A1* | 12/2013 | Yamada | H04M 1/67 |
| | | | 726/4 |
| 2014/0198620 A1 | 7/2014 | Prausse et al. | |
| 2014/0372762 A1* | 12/2014 | Flautner | H04L 9/3226 |
| | | | 713/173 |
| 2015/0161434 A1 | 6/2015 | Ross et al. | |
| 2015/0186711 A1 | 7/2015 | Baldwin et al. | |
| 2015/0288688 A1 | 10/2015 | Derakhshani | |
| 2015/0294108 A1* | 10/2015 | Kim | G06F 21/45 |
| | | | 726/18 |
| 2016/0007935 A1 | 1/2016 | Hernandez et al. | |

OTHER PUBLICATIONS

Motorola Mobility, Inc., (2011) "Motorola Defy+ with Motoblur", retrieved from the internet on Jun. 25, 2015: URL: https://motorola-global-en-aus.custhelp.com/ci/fattach/get/588640/1360689155/redirect/1/filename/defy_plus_ug_au_en_68016355001_v3.pdf (70 pages).

Anjos, A. and Marcel, S., "Counter-measures to Photo Attacks in Face Recognition: A Public Database and a Baseline," Int'l Joint Conf. on Biometrics; pp. 1-7; Oct. 2011.

Bao, et al. "A Liveness Detection Method for Face Recognition Based on Optical Flow Field," 2009 Int'l Conf. on Image Analysis and Signal Processing; pp. 233-236; Apr. 2009.

Bharadwaj, et al., "Computationally Efficient Face Spoofing Detection with Motion Magnification," 2013 IEEE Conf. on Computer Vision and Pattern Recognition Workshops; pp. 105-110; Jun. 2013.

Chingovska, et al., "On the Effectiveness of Local Binary Patterns in Face Anti-Spoofing," Proc. Of the Int'l Conf. BIOSIG; pp. 1-7; Sep. 2012.

Cho, et al., "Real-time Iris Localization for Iris Recognition in Cellular Phone," 6th Int'l Conf. on Software Eng., Artificial Intelligence, Networking and Parallel/Distributed Computing; pp. 254-259; May 2005.

de Freitas Pereira, et al., "Can Face Anti-Spoofing Countermeasures Work in a Real World Scenario?," 2013 Int'l Conf. on Biometrics (ICB); pp. 1-8; Jun. 2013.

de Freitas Pereira, et al., "LBP-TOP Based Countermeasure Against Face Spoofing Attacks," Int'l Workshop on Computer Vision with Local Binary Pattern Variants (ACCV)—Lecture Notes in Computer Science; 7728:121-132; Nov. 2012.

Evans, et al., "Guest Editorial: Special Issue on Biometric Spoofing and Countermeasures," IEEE Trans. Information Forensics and Security; 10(4):699-702; Apr. 2015.

Galbally, et al., "Image Quality Assessment for Fake Biometric Detection: Application to Iris, Fingerprint, and Face Recognition," IEEE Transactions on Image Processing; 23(2): 710-724; Nov. 2013.

Google Patents, "Cardiac performance monitoring system for use with mobile communications devices (U.S. Pat. No. 8,700,137B2)," accessed on the internet at http://www.google.com/patents/US8700137; downloaded May 24, 2016; 39pgs.

Google Patents, "Facial Recognition (U.S. Pat. No. 8,457,367B2)," accessed on the internet at http://www.google.com/patents/US8457367; downloaded May 24, 2016; 42pgs.

Hernandez, et al., "Biophone: Physiology Monitoring from Peripheral Smartphone Motions," 2015 37th Annual Int'l Conf. of the IEEE Engineering in Medicine and Biology Society (EMBC); pp. 7180-7183; Aug. 2015.

Int'l Business Times, "Android Jelly Bean Face Unlock 'Liveness Check' Bypassed with Photo Editing," accessed on the internet at http://www.ibtimes.co.uk/androidjellybeanfaceunlockhackedphotoediting370426; downloaded May 24, 2016; 3pgs.

Kollreider, et al., "Real-Time Face Detection and Motion Analysis with Application in 'Liveness' Assessment," IEEE Transactions on Information Forensics and Security; 2(3):548-558; Sep. 2007.

Li, et al., "Live Face Detection Based on the Analysis of Fourier Spectra," SPIE Proceedings: Biometric Technology for Human Identification; 5404:296-303; Aug. 2004.

McKerrow, et al., "Classifying Still Faces with Ultrasonic Sensing," J. Robotics and Autonomous Systems; 55(9):702-710; Sep. 2007.

Sun, et al., "Blinking-based Live Face Detection Using Conditional Random Fields," International Conference on Advances in Biometrics—Lecture Notes in Computer Science; 4642:252-260; Aug. 2007.

Tabula Rasa, "Trusted Biometrics under Spoofing Attacks," accessed on the internet at http://www.tabularasa-euproject.org; downloaded May 24, 2016; 2pgs.

Tan, et al., "Face Liveness Detection from a Single Image with sparse Low Rank Bilinear Discriminative Model," 11th European Conf. on Computer Vision—Lecture Notes in Computer Science ; 6316:504-517; Sep. 2010.

Wang, et al., "Exploiting Spatial Redundancy of Image Sensor for Motion Robust rPPG," IEEE Transactions on Biomedical Engineering; 62(2):415-425; Feb. 2015.

Wen, et al., "Face Spoof Detection with Image Distortion Analysis," IEEE Trans. Information Forensics and Security; 10(4):746-761; Apr. 2015.

Zhang, et al. "A Face Anti-Spoofing Database with Diverse Attacks," 5th IAPR Int'l Conf. on Biometrics (ICB); pp. 26-31; Mar. 2012.

Zhenwei, et al., "Human Face Classification Using Ultrasonic Sonar Imaging," Japanese J. Appl. Phys.; 48(7S):07GC11; Jun. 2009.

Guillaume, G., et al., "Face Detection Method Based on Photoplethysmography," 2013 10th IEEE Int'l Conf. on Advanced Video and Signal Based Surveillance (AVSS); pp. 449-453; Aug. 27, 2013.

Int'l Search Report and Written Opinion of the ISA/EP in PCT/US2016/035007; 12pgs.; dated Aug. 19, 2016.

Kose, N., et al., "Countermeasure for the Protection of Face Recognition Systems Against Mask Attacks," 10th IEEE Int'l Conf. on Automatic Face and Gesture Recognition (FG2013); 6pgs; Apr. 22-26, 2013.

Miao, Z, et al., "Human Face Classification Using Ultrasonic Sonar Imaging," Japanese J. Applied Phys.; 48(7):07GC11-1-07GC11-5; Jul. 2009.

Anjos A et al., 'Chapter 4: Face Anti-Spoofing: Visual Approach,' *Handbook of Biometric Anti-Spoofing*, (1st Ed, 2014), S Marcel et al., (eds), Springer-Verlag, London, UK (pub), pp. 65-82.

(56) References Cited

OTHER PUBLICATIONS

Anonymous, (2016), 'Proximity and Ambient Light Sensing (ALS) Module,' Datasheet for Model No. VL6180X, Document No. ID026171 Rev 7, Mar. 2016, STMicroelectronics NV, Geneva, CH (pub), (87 pages), downloaded from the internet on May 30, 2017 from <http://www.st.com/content/ccc/resource/technical/document/datasheet/c4/11/28/86/e6/26/44/b3/DM00112632.pdf/files/DM00112632.pdf/jcr:content/translations/en.DM00112632.pdf.

Chingovska I et al., 'Chapter 8: Face Recognition Systems Under Spoofing Attacks,' *Face Recognition Across the Imaging Spectrum*, (1st Ed, 2016), T Bourlai (ed), Springer International Publishing, New York, NY (pub), pp. 165-194.

International Search Report and Written Opinion of the International Searching Authority for International Application No. PCT/US2017/020166 dated Jun. 8, 2017 (14 pages).

* cited by examiner

BIO LEASH FOR USER AUTHENTICATION

CROSS-REFERENCE TO RELATED APPLICATION

This application claims priority to and the benefit of U.S. Provisional Patent Application No. 61/976,219, filed on Apr. 7, 2014, and entitled "Bio Leash for User Authentication," the entirety of which is incorporated by reference herein.

BACKGROUND

The present disclosure relates generally to user authentication and, more particularly, to systems and methods for electronically leashing a user (that is, the user's biological presence within a certain proximity) to a mobile device using radio waves, sound waves, captured imagery, and other sensor data available to the mobile device.

Existing techniques for authenticating a user on a mobile or other computing device require the user to reenter a password, passphrase, PIN, gesture, digital certificate, biometric identifier, or other security identifier (henceforth referred to as primary identifier) each time that the user desires to engage with the device after a period of non-use, or other authenticated state exit conditions such as pressing a button or switching to another application. For example, after a timeout period or pressing a button, the lock screen of the mobile device may reactivate, or the user may have to login again using a primary identifier to secure applications, websites, or other services offered through the device. In other instances, a user may have to enter a primary identifier for each feature or website that the user wants to engage with, even though the user has been previously authenticated by a primary identifier for another use. These reauthentication requirements can be frustrating and cumbersome for the user, particularly if the mobile device has remained in the possession of the user.

BRIEF SUMMARY

Systems and methods are presented for electronically leashing a user to a mobile device in order to minimize the need for the user to reauthenticate with the mobile device using the primary identifier. A user is authenticated on the mobile device and initial sensor data (e.g., radio signal readings, accelerometer and magnetometer readings, image/video, audio) is collected. Based on a device movement, a timer, or other triggering event, additional sensor data is captured and evaluated. Based on the evaluation of the sensor data, a probability or related binding score of whether the device remains in possession of the user is determined. Upon determining that this probability or binding score is less than a threshold, the authenticated state is invalidated (or lessened) and the user is required to reauthenticate on the mobile device using a primary identifier to further engage with the device or particular features and services on the device. Because the calculated bio leash strength covers an interval, several such thresholds can be set to limit the behavior and access level of a variety of services on the device depending on their sensitivity and security requirements. For instance, a lower strength of the bio leash can disable access to high security applications (or limit their functionality), while still allowing for access to lower security applications and functions without a need for reauthentication by a primary identifier.

The details of one or more implementations of the subject matter described in the present specification are set forth in the accompanying drawings and the description below. Other features, aspects, and advantages of the subject matter will become apparent from the description, the drawings, and the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the implementations. In the following description, various implementations are described with reference to the following drawings, in which.

DETAILED DESCRIPTION

Described herein in various implementations are systems and accompanying methods for determining whether a mobile device remains in a user's possession using functionality available on the mobile device, such as radio, audio, imaging, motion, orientation, and other sensor features. A biological-electronic leash can be formed between the user and the mobile device and, when the leash is broken or weakened below a threshold, the user can be required to reauthenticate with the device using a primary identifier. As used herein the terms "bio leash" and "electronic leash" refer to an association that is created between an authenticated user and a mobile device and maintained by determining whether the device remains in physical possession of the user. "In possession of the user" can include physical possession, such as holding the mobile device or having the device in a pocket, an accompanying handbag or suitcase, etc., within a certain proximity, such as having the mobile device in a direct line of sight, maintaining the mobile device within a specific radius of the user, and so on.

Figure 1:
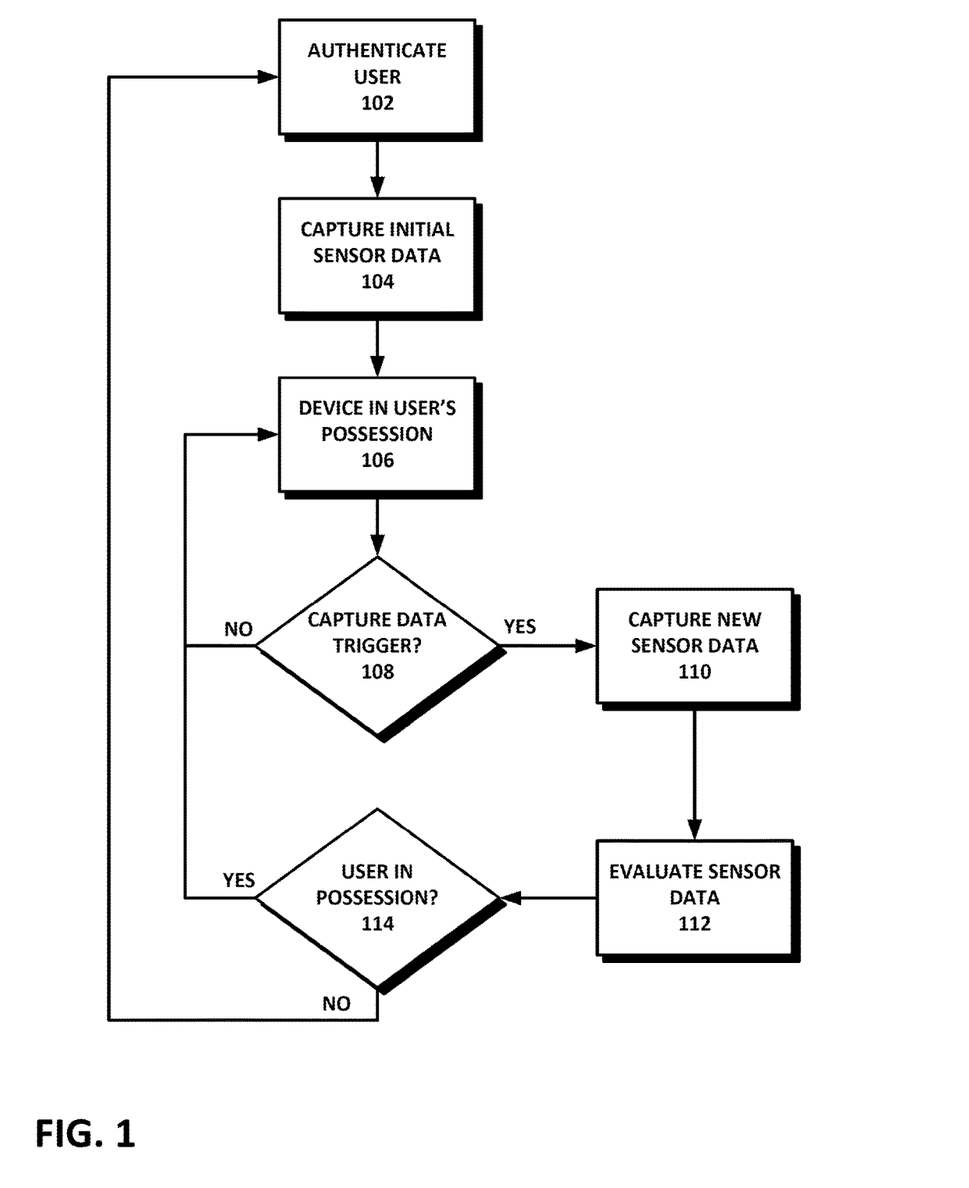
FIG. 1 is a flowchart of an example method for electronically leashing a user (establishing a bio leash) to a mobile device according to an implementation.

FIG. 1 illustrates one implementation of a method for electronically leashing the biological and physical presence of a user to a mobile device in order to reduce or eliminate the need for the user to reauthenticate with the device using the primary identifier while the device remains in the possession of the user. The mobile device can be a device that includes one or more of a wireless signal transmitter/receiver, accelerometer, magnetometer, microphone, speaker, image sensor, various light sources, and/or other components that can capture sensor data for use as described herein. The mobile device can be, for example, a smartphone, a tablet, a personal digital assistant, a smart watch, smart glasses, a gaming device, a music player, a laptop, and so on. The mobile device can include an authentication application that evaluates the data received from sensors on the mobile device and determines the state and the strength of the bio leash.

In STEP 102, the user is authenticated with the mobile device with a primary identifier. The primary identifier authentication can include a suitable technique for discovering or verifying the user's identity, such as requiring the user to input a password, passphrase, gesture, digital certificate, PIN, and/or a biometric identifier (e.g., eyeprint, fingerprint, iris pattern, etc.). Once the user is authenticated by a suitable primary identifier, the user can engage with the various features of the device without having to enter further identity-verifying information. For example, the initial authentication can allow the user to make phone calls, browse secure websites, use applications on the device, and so on.

After the user is successfully authenticated by a primary identifier, the mobile device can begin capturing data from one or more sensors on the device (STEP 104). For example, a front-facing or other camera on the device can capture an image of the user and take note of various identifying characteristics, such as the color and/or texture of the user's clothing, facial features, hairstyle, skin tone, and so on. A radio transmitter/receiver on the device can capture signal strength readings and other quality of signal indicators based on communication with a cellular phone tower, wireless base station, or other access point or device. One or more radio transmitter/receivers on the device can also act as a radar device by periodically pinging the user's body with a low power signal and determining whether an echo of the signal indicates the physical presence of the user, where the echo is generated at the air-skin boundary and/or internal layers of the body such as fat, muscle, lung, heart, and bone boundaries. Other initial data capture can include audio (e.g., pinging the user with sound waves and using acoustic localization techniques to determine the physical presence of the user), as well as readings from other sensors on the mobile device, such as an accelerometer (e.g., to determine whether the device is still, moving with the user, or subject to some other force).

With the authentication in STEP 102 and the initial capture of sensor data in STEP 104, bio leash (i.e., physical binding) is established between the user and the mobile device, and the device is assumed to be in the user's possession (STEP 106). The mobile device can then continuously or periodically capture sensor data to reevaluate the status of the bio leash, and/or can capture one or more types of data upon determining that a trigger condition has occurred (e.g., in order to preserve battery life) (STEP 108). For example, as indicated above, the mobile device radio transmitter/receivers can act as active or passive radar devices, and periodically (e.g., every 500 ms, 1 s, 5 s, etc.) emit a unidirectional, multidirectional, and/or omnidirectional radio signal in the form of an M-sequence, pulse, chirp, or other narrow or wide band probe signals (depending on radio and antenna capability), or listen to the changes of existing ambient radio waves, to detect the user's presence from the received signal pattern as it is altered by absorbance, reflectance, and other waveform changing properties of different layers of the user's body. As another example, the mobile device can capture radio signal and/or sound wave readings when triggered by an accelerometer and/or compass/gyro sensor in the device (e.g., the accelerometer registers a reading greater than a threshold value and optionally conforming to certain activity profiles, thereby indicating that the mobile device has changed position, been picked up or put down on a surface, been suddenly moved, or some other force has been applied to the device).

In some situations, an image sensor on the mobile device can be triggered to capture images and/or video upon determining that at least one image sensor has a line of sight to the user and thus revalidate the bio leash by confirming the continued presence of the original user. In one implementation, this is accomplished by comparing the user's appearance as registered at the time of establishing the bio leash with what is seen at the trigger time. In other situations, the above-mentioned image capture is triggered with an accelerometer and/or orientation signal indicating a possible device pick-up. For the bio leash to remain intact, within a certain time frame, the original user must be present in the device's imaging field of view (e.g., the front-facing camera of a mobile device should see the user's complete or partial face and, in some instances, possibly more, such as clothing items, and so on). If similarity is confirmed with the registered appearance at the time of leash establishment by the primary identifier, and, in some instances, if other conditions are also met (e.g., the device did not lose a radio link with the user's body for more than a certain maximum time), the bio leash remains intact. Otherwise, depending on the severity of violation of the aforesaid conditions, the bio leash is either invalidated or its strength is diminished accordingly.

In general, if the bio leash's radio link with the user is broken or diminished for a period of time, the leash strength is reduced according to the severity and period of the violation. The leash strength can also continue to diminish over time with a decay function (e.g., linear) until the bio leash is invalidated, unless other bio leash enforcing signals, such as earlier mentioned auxiliary visual confirmations stop the leash's strength decay or strengthen the bio leash to a certain degree pending the strength and timing of the auxiliary confirmation signal(s). At any point, a successful primary identification can reset and restore the bio leash to its original maximum strength and state.

If the mobile device is prompted to capture new sensor data (whether in response to a trigger, timer, or other event), the method proceeds to STEP 110, where additional data is collected, and then to STEP 112, where the data is evaluated. If the evaluation of the newly collected data (which can also take into account the initially captured data) indicates that the user is no longer in possession of the mobile device (STEP 114), the user is directed to reauthenticate with the device in order to further engage with it (STEP 102). In some implementations, the evaluation of the data can produce a probability or otherwise a soft score (leash strength) that the user is still in possession of the mobile device. If the probability or other calculated indicator of device binding falls below a threshold (e.g., 25%, 50%, 75%, 90%, etc.), then the bio leash is assumed to be broken, and the user is required to reauthenticate. In some implementations, this variable leash strength can be used to individually change the behavior and authentication/access state of different applications and services on the device. For instance, at some decreased leash strength, some less sensitive apps and services can continue to stay in their authenticated state, while more sensitive apps and services can exit their authenticated state, and the rest of the apps and processes can enter a semi-authenticated state offering limited (less-sensitive) services.

The evaluation performed to determine the probability or other scoring value representing that the user is in possession of the mobile device (leash strength) can vary based on the type or types of data being captured. In one implementation, possession is measured based on received radio signal strength changes from a connected tower, wireless base station, and/or other device. Signal strength can be measured using one or a combination of wireless signals (e.g., CDMA, GSM, Wi-Fi, Bluetooth, LTE, 3G, etc.). The signal strength of one or more of the signals can be measured when the user authenticates with the device, and can also be measured periodically and/or on a triggering event (e.g., when accelerometer readings indicate that the device is moved beyond normally recognized movements, such as moving with the user as a result of a turning torso while seated or walking). The delta of signal strength readings (individual readings and/or averages over time) can then be compared to an acceptable signal variance threshold. If the delta exceeds the threshold (e.g., once or a particular number of times over a period), the probability that the device is in possession of the user is reduced. The drop in leash strength can vary based on the amount of the delta beyond the threshold. In some implementations, the signal strength variance is only one factor in a number of factors that can be combined or weighed to produce an overall binding probability or leash strength. In another implementation, the mobile device also acts as the active source of the radio signal (i.e., measuring the strength of a self-generated signal as it is being attenuated by the user's close presence).

Examples of some common signal strength indicator changes as a result of user holding a phone vs. leaving it on a table are as follows (using an iPhone 5 on Sprint LTE, measured every two seconds over a period of 6-10 seconds): received signal strength indicator (RSSI) increase is on average 30 dBm or more, and Reference Signal Received Power (RSRP) average increase is 20 dBm or more.

In another implementation, the mobile device can act similar to an active radar system that creates a low power ping signal using, for example, a Wi-Fi or Bluetooth radio on the device. The ping signals can be produced periodically and/or in response to a triggering event (e.g., when accelerometer readings indicate that the device is moved beyond normally recognized movements, such as moving with the user as a result of turning the torso while seated or walking). The echo of the ping signal can be evaluated to determine if the user is in close proximity to the device (e.g., if the device is being held by the user, in the user's pocket or handbag, within a certain radius of the user, and so on). Based on the signal echo readings, a probability or other correlated score can be determined whether the user is in physical or proximate possession of the device. The probability can vary based on the particular readings (e.g., whether the user appears to be closer or further away from the device based on the skin-air boundary reflection, and/or other parts of the echo signal having a morphology corresponding to multi-layer reflections due to internal organ boundaries, and optionally the Doppler shift induced by the movements of heart and lung). In some implementations, the radar readings are only one factor in a number of factors that can be combined or weighed to produce an overall binding probability or bio leash strength.

In some implementations, other radio signal transmission and receiving characteristics can be used alone or in combination with other radio signal readings as described above in order to more accurately determine the likelihood that the user is in possession of the mobile device. These characteristics can include, but are not limited to, signal morphology due to skin-air boundary reflection, and/or the morphology of the echo signal resembling the multi-layer reflections due to internal organ boundaries, and optionally the Doppler shift induced by the movements of heart and lung, bit error rates and patterns, group and phase delay, constructive and destructive interferences of the signal reflections, and phase constellation dynamics.

In one implementation, the probability that the user is in possession of the mobile device can be based on readings from an accelerometer, gyroscope, compass, or other motion detection component of the mobile device. For example, if an accelerometer in the mobile device detects a violent motion (e.g., that the phone has been grabbed away from the user), then the bio leash can be broken or significantly weakened depending on dissimilarity of the detected motion pattern to acceptable movements such as walking, leaning, or twisting the torso while the user is carrying the mobile device. In some instances, the authentication application on the device can incorporate pattern recognition or machine learning functionality so that the application can more accurately determine whether sensor readings deviate from a user's norm. In one example, the application learns over time how the user normally holds the phone, the user's gait, whether the user is driving a vehicle, strength and morphology of the received radio signals in both passive and active radar modes, and so on, based on readings from motion sensors and radios in the mobile device, pending one or more positive verifications by the primary identifier during these observation periods to ensure that the patterns were recorded while the legitimate user was in possession of the device. Then, if a sensor detects movement of the mobile device that is a significant aberration from the user's typical movements, the bio leash can be broken or its strength can be weakened (i.e., the probability or other score representing that the device is in possession of the user is decreased). This learning results in fewer erroneous leash alterations as the bio leash learns the user's natural behavioral and radio signal fingerprints. These machine learning techniques can be applied to readings from other sensors on the mobile device as well. Over time, the user's habits, behaviors, and even radar signatures can be identified, and the application can determine appropriate amounts of deviation from average behavior and signal templates and thus avoid erroneously affecting the bio leash.

In some implementations, the learned user behavior and radar fingerprints can be used as a soft biometric to better and more accurately enforce the bio leash.

In one implementation, the probability that the user is in possession of the mobile device can be based on audio captured by microphone(s) on the mobile device. For example, the mobile device can emit ping tones via a speaker, capture the echo of the tones, and use sonar or other acoustic radar methods to determine whether the user is in contact with or in close proximity to the device. The ping tones can be produced periodically and/or in response to a triggering event (e.g., when accelerometer readings indicate that the device is moved beyond normally recognized movements). The determined probability that the user is in possession of the mobile device can vary based on the particular readings (e.g., whether the user appears to be closer or further away from the device). In some implementations, the acoustic reflection and absorption readings are only one factor in a number of factors that can be combined or weighed to produce an overall probability or leash strength.

In one implementation, the probability that the user is in possession of the mobile device can be based on images and/or video of the user captured by a camera or other image sensor on the mobile device. For example, at the time of primary identification, a front-facing or other camera on the device can capture an image of the user and take note of various identifying characteristics, such as the color and/or texture of the user's clothing, facial features, peri-ocular features, hairstyle and color, skin tone, and so on, in order to establish a dynamic visual template and maintain a short term soft-biometric connection to the user starting from the time of primary identification and onward. The image/video can be captured when the user authenticates with the device. Afterwards, the image/video captures can be taken periodically, or in response to some other triggering event (e.g., when the user picks up the phone, when the user places the phone in a line of sight to the user, etc.). If the identifying characteristics captured by the mobile device match previously identified characteristics (e.g., the user's face is recognized), then the probability that the device is in the user's possession can be increased or maintained. If there is only a partial recognition (e.g., from a partially captured face), or if the confirmation is based on less specific visual cues such as clothing features that are captured and recognized, the leash strength can decrease proportionally. If, at the time of a trigger (such as when the device is being picked up), the user is not recognized based on the captured images/video, the leash can be broken. In some implementations, the image/video captures are only one factor in a number of factors that can be combined or weighed to produce an overall binding probability, with other factors being radio or sonar physical attachment/user proximity sensing, or other soft biometrics such as background voice recognition, as described further below.

In one implementation, if the user's voice template is available, and if the user is identified in the background via his or her voice patterns any time after the primary identification, and if the level (loudness) of the identified voice implies close physical proximity to the user, the leash strength can be maintained or otherwise adjusted depending on the strength and timing(s) of the background voice verifications.

In one implementation, the authentication state of the user is not binary (i.e., bio leash broken or not broken), but rather includes a plurality of authentication state tiers (e.g., three or more). For example, after a user authenticates with the mobile device, the bio leash can exist in a top tier that represents a strong physical binding with the device. In the top tier, the user can have access to all features and secure logins without the need to provide further identifying information. The bottom tier can represent a complete breaking of the bio leash, requiring the user to reauthenticate with the mobile device in order to access any features of the device.

Between the top and bottom tiers can be one or more intermediate tiers that represent a partially authenticated state. As the authentication state moves down each intermediate tier, the features available to the user without reauthentication can be reduced. For example, if the authentication state decreases from the top tier to the first intermediate tier, the user will be unable to access financial applications, banking websites, and a secure VPN without reauthentication. If the user moves down to a second intermediate tier, the user is no longer able to browse the Internet or make international phone calls. The authentication state can change as the authentication application on the mobile device determines that the user is less likely to be in possession of the mobile device, using sensor data as described herein. For example, the top tier can be associated with a >=90% certainty that the user is in possession of the mobile device, the last tier with a <=20% certainty, and varying likelihoods for the intermediate tiers. The % certainty of possession is also referred to herein as the leash strength.

In some instances, the authentication state or leash strength degrades over time at a faster pace if the mobile device is not in close physical possession of the user (e.g., held by the user, in the user's pocket, etc.). In some implementations, the calculated strength of the leash decreases from the time of establishment with a certain decaying function, such as linear or exponential, unless some or all of the aforementioned soft biometrics reduce the leash decay (depending on the number and strength of positive confirmations of identity). For example, as soon as the mobile device is determined not to be in the physical possession of the user (e.g., the user puts the device down), the leash strength can immediately reduce to 80%. Then, provided the user remains within a threshold radius (e.g., 1-3 meters) of the device, the leash strength can decremented by 1% for every minute that passes. Greater distances or other events (e.g., a violent movement of the device) can result in greater decrements or a complete breaking of the leash. When the user reengages with the mobile device, the user's authentication tier can then correspond with the current leash strength. In one implementation, the mobile device also attempts to passively soft authenticate the user when the user reengages with the device (e.g., by using a camera on the device to recognize the user's face, clothing, etc.) and, if the passively authentication is successful, the leash strength can be recalculated. For example, if the current leash strength is 50% and the mobile device recognizes the user within the first 5 minutes of primary identification by the checkered red and black shirt he or she is wearing, the resulting leash strength can increase to 60%, 70%, or more. Such leash strength recalculations can depend on the strength, number, and/or timing of such soft-biometric authentication signals in conjunction with the strength and history of user proximity signals from the time of the primary identification.

Figure 2:
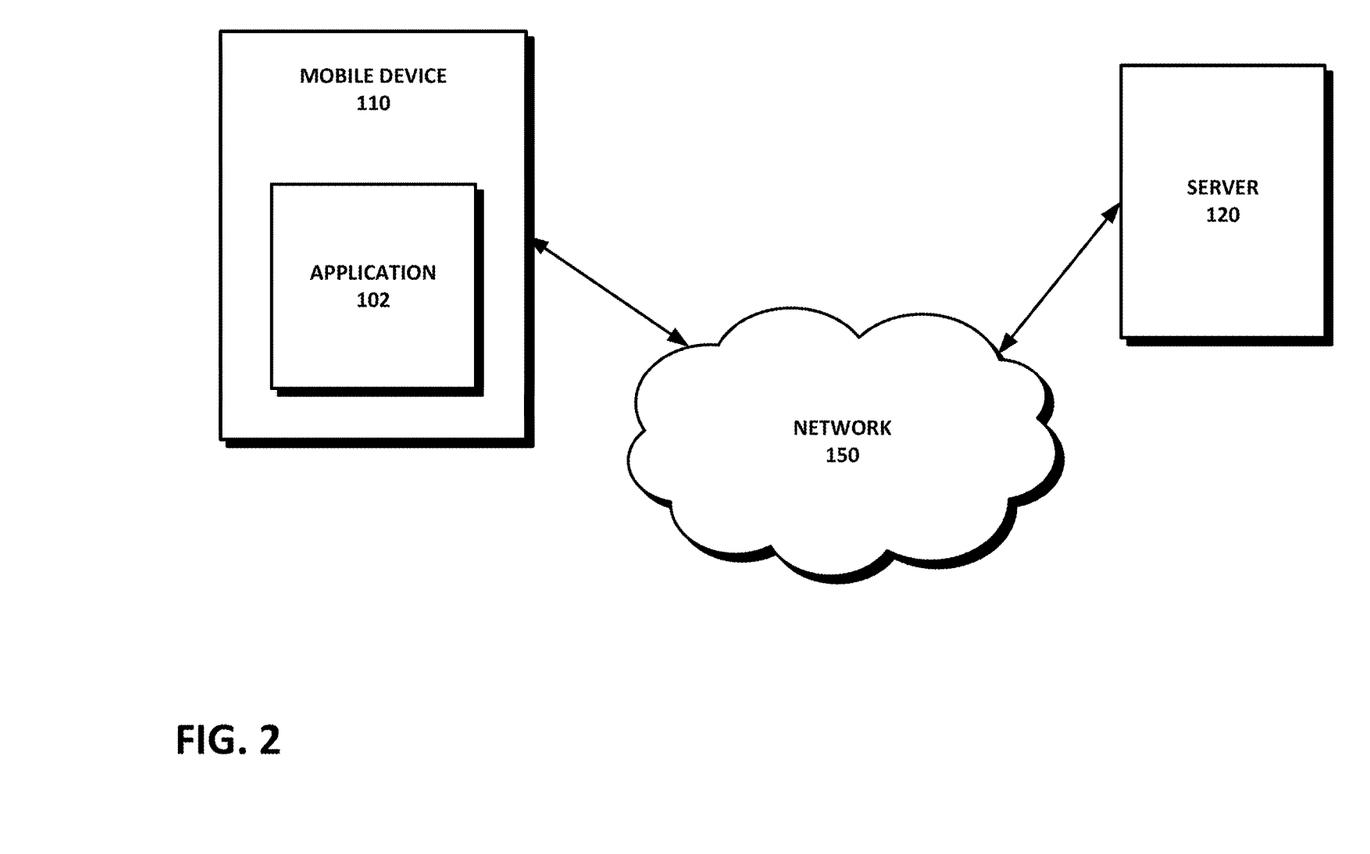
FIG. 2 is a diagram of an example high-level architecture of a system for electronically leashing a user to a mobile device according to an implementation.

In one implementation, referring to FIG. 2, the above techniques can be implemented on an application 102 on a mobile device 110. In some instances, certain processes (e.g., evaluation of sensor data) can be performed remotely on a server 120 that communicates with the application 102 on the mobile device 110 through a communications network 150. The communication can take place over media such as standard telephone lines, LAN or WAN links (e.g., T1, T3, 56kb, X.25), broadband connections (ISDN, Frame Relay, ATM), wireless links (802.11 (Wi-Fi), Bluetooth, GSM, CDMA, etc.), for example. Other communication media are possible. The network can carry TCP/IP protocol communications, and HTTP/HTTPS requests made by a web browser, and the connection between the client devices and servers can be communicated over such TCP/IP networks. Other communication protocols are contemplated.

Implementations of the system described herein can use appropriate hardware or software; for example, the system can execute on hardware capable of running an operating system such as the Microsoft Windows® operating systems, the Apple OS X® operating systems, the Apple iOS® platform, the Google Android™ platform, the Linux® operating system and other variants of UNIX® operating systems, and the like.

Some or all of the functionality described herein can be implemented in software and/or hardware. Such hardware can include, but is not limited to, a smart phone, smart watch, smart glasses, tablet computer, portable computer, television, gaming device, music player, mobile telephone, laptop, palmtop, smart or dumb terminal, network computer, personal digital assistant, wireless device, information appliance, workstation, minicomputer, mainframe computer, or other computing device, that is operated as a general purpose computer or a special purpose hardware device that can execute the functionality described herein. The software, for example, can be implemented on a general purpose computing device in the form of a computer including a processing unit, a system memory, and a system bus that couples various system components including the system memory to the processing unit.

Additionally or alternatively, some or all of the functionality can be performed remotely, in the cloud, or via software-as-a-service. For example, certain functions can be performed on one or more remote servers or other devices that communicate with client devices. The remote functionality can execute on server class computers that have sufficient memory, data storage, and processing power and that run a server class operating system (e.g., Oracle® Solaris®, GNU/Linux®, and the Microsoft® Windows® family of operating systems).

The system can include a plurality of software processing modules stored in a memory and executed on a processor. By way of illustration, the program modules can be in the form of one or more suitable programming languages, which are converted to machine language or object code to allow the processor or processors to execute the instructions. The software can be in the form of a standalone application, implemented in a suitable programming language or framework.

Method steps of the techniques described herein can be performed by one or more programmable processors executing one or more computer programs to perform functions by operating on input data and generating output. Method steps can also be performed by, and apparatus can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors. Generally, a processor will receive instructions and data from a read-only memory or a random access memory or both. The essential elements of a computer are a processor for executing instructions and one or more memory devices for storing instructions and data. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. One or more memories can store media assets (e.g., audio, video, graphics, interface elements, and/or other media files), configuration files, and/or instructions that, when executed by a processor, form the modules, engines, and other components described herein and perform the functionality associated with the components. The processor and the memory can be supplemented by, or incorporated in special purpose logic circuitry.

The system can also be practiced in distributed computing environments where tasks are performed by remote processing devices that are linked through a communications network. In a distributed computing environment, program modules can be located in both local and remote computer storage media including memory storage devices. Other types of system hardware and software than that described herein can also be used, depending on the capacity of the device and the amount of required data processing capability. The system can also be implemented on one or more virtual machines executing virtualized operating systems such as those mentioned above, and that operate on one or more computers having hardware such as that described herein.

It should also be noted that implementations of the systems and methods can be provided as one or more computer-readable programs embodied on or in one or more articles of manufacture. The program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The terms and expressions employed herein are used as terms and expressions of description and not of limitation, and there is no intention, in the use of such terms and expressions, of excluding any equivalents of the features shown and described or portions thereof. In addition, having described certain implementations in the present disclosure, it will be apparent to those of ordinary skill in the art that other implementations incorporating the concepts disclosed herein can be used without departing from the spirit and scope of the invention. The features and functions of the various implementations can be arranged in various combinations and permutations, and all are considered to be within the scope of the disclosed invention. Accordingly, the described implementations are to be considered in all respects as illustrative and not restrictive. The configurations, materials, and dimensions described herein are also intended as illustrative and in no way limiting. Similarly, although physical explanations have been provided for explanatory purposes, there is no intent to be bound by any particular theory or mechanism, or to limit the claims in accordance therewith.

What is claimed is:

1. A computer-implemented method comprising:
   authenticating a user on a mobile device at a first time and, based thereon, authenticating the user to use a set of features on the mobile device;
   capturing first device possession measurement data by the mobile device and, based on an evaluation of the first device possession measurement data, establishing that the mobile device is in physical possession of the user;
   capturing movement data by a movement or positional sensor of the mobile device;
   determining that the movement data exceeds a threshold and has resulted in an occurrence of a triggering event, and, in response thereto, initiating capture by the mobile device of second device possession measurement data comprising radio signal data, sound wave data, image data, or video data;
   determining, based at least in part on an evaluation of the second device possession measurement data captured by the mobile device, a value representing a likelihood that the device remains in physical possession of the user;
   at a second, later time while the user is still authenticated on the mobile device, upon determining that the value is greater than a first threshold and less than a second threshold, deactivating a subset of the features on the mobile device for which the user was previously authenticated at the first time; and
   upon determining that the value is less than the first threshold, requiring the user to reauthenticate on the mobile device.

2. The method of claim 1, wherein the user is authenticated based on at least one of a password, a passphrase, a gesture, a digital certificate, and a biometric identifier.

3. The method of claim 1, wherein at least one of the first device possession measurement data and the second device possession measurement data captured by the mobile device comprises a plurality of radio signal readings.

4. The method of claim 3, wherein determining the value comprises evaluating whether a difference between the radio signal readings exceeds a threshold.

5. The method of claim 3, wherein the evaluation is performed upon determining that the mobile device has moved.

6. The method of claim 1, wherein at least one of the first device possession measurement data and the second device possession measurement data captured by the mobile device comprises readings from a movement or positional sensor.

7. The method of claim 6, wherein determining the value comprises evaluating whether the movement or positional sensor readings conform with a known behavior pattern of the user.

8. The method of claim 1, wherein at least one of the first device possession measurement data and the second device possession measurement data captured by the mobile device comprises audio captured by a microphone associated with the mobile device.

9. The method of claim 8, wherein determining the value comprises using at least one of acoustic location and voice recognition to determine whether the user is within a threshold distance of the mobile device.

10. The method of claim 9, wherein the acoustic location is performed upon determining that the mobile device has moved.

11. The method of claim 1, wherein at least one of the first device possession measurement data and the second device possession measurement data captured by the mobile device comprises one or more images captured by a camera associated with the mobile device.

12. The method of claim 11, wherein determining the value comprises analyzing the images to determine whether the user is shown.

13. The method of claim 11, wherein at least one of the images is captured upon determining that the camera associated with the mobile device has a line of sight to the user.

14. The method of claim 1, wherein the first device possession measurement data and the second device possession measurement data are captured using different data capturing components of the mobile device.

15. The method of claim 1, wherein the triggering event comprises a determination, based on the movement data, that the mobile device (i) has been picked up, (ii) has been put down, (iii) has experienced sudden or violent movement, or (iv) has experienced movement different from an expected pattern of movement.

16. A system comprising:
one or more computers programmed to perform operations comprising:
authenticating a user on a mobile device at a first time and, based thereon, authenticating the user to use a set of features on the mobile device;
capturing first device possession measurement data by the mobile device and, based on an evaluation of the first device possession measurement data, establishing that the mobile device is in physical possession of the user;
capturing movement data by a movement or positional sensor of the mobile device;
determining that the movement data exceeds a threshold and has resulted in an occurrence of a triggering event, and, in response thereto, initiating capture by the mobile device of second device possession measurement data comprising radio signal data, sound wave data, image data, or video data;
determining, based at least in part on an evaluation of the second device possession measurement data captured by the mobile device, a value representing a likelihood that the device remains in physical possession of the user;
at a second, later time while the user is still authenticated on the mobile device, upon determining that the value is greater than a first threshold and less than a second threshold, deactivating a subset of the features on the mobile device for which the user was previously authenticated at the first time; and
upon determining that the value is less than the first threshold, requiring the user to reauthenticate on the mobile device.

17. The system of claim 16, wherein the user is authenticated based on at least one of a password, a passphrase, a gesture, a digital certificate, and a biometric identifier.

18. The system of claim 16, wherein at least one of the first device possession measurement data and the second device possession measurement data captured by the mobile device comprises a plurality of radio signal readings.

19. The system of claim 18, wherein determining the value comprises evaluating whether a difference between the radio signal readings exceeds a threshold.

20. The system of claim 18, wherein the evaluation is performed upon determining that the mobile device has moved.

21. The system of claim 16, wherein at least one of the first device possession measurement data and the second device possession measurement data captured by the mobile device comprises readings from a movement or positional sensor.

22. The system of claim 21, wherein determining the value comprises evaluating whether the movement or positional sensor readings conform with a known behavior pattern of the user.

23. The system of claim 16, wherein at least one of the first device possession measurement data and the second device possession measurement data captured by the mobile device comprises audio captured by a microphone associated with the mobile device.

24. The system of claim 23, wherein determining the value comprises using at least one of acoustic location and voice recognition to determine whether the user is within a threshold distance of the mobile device.

25. The system of claim 24, wherein the acoustic location is performed upon determining that the mobile device has moved.

26. The system of claim 16, wherein at least one of the first device possession measurement data and the second device possession measurement data captured by the mobile device comprises one or more images captured by a camera associated with the mobile device.

27. The system of claim 26, wherein determining the value comprises analyzing the images to determine whether the user is shown.

28. The system of claim 26, wherein at least one of the images is captured upon determining that the camera associated with the mobile device has a line of sight to the user.

* * * * *